(12) United States Patent
Estes

(10) Patent No.: US 6,842,699 B2
(45) Date of Patent: *Jan. 11, 2005

(54) USE OF MWD ASSEMBLY FOR MULTIPLE-WELL DRILLING

(75) Inventor: Robert A. Estes, Tomball, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/341,637

(22) Filed: Jan. 14, 2003

(65) Prior Publication Data

US 2003/0236627 A1 Dec. 25, 2003

Related U.S. Application Data

(60) Division of application No. 09/669,759, filed on Sep. 26, 2000, now Pat. No. 6,529,834, which is a continuation-in-part of application No. 09/204,908, filed on Dec. 3, 1998, now Pat. No. 6,347,282.
(60) Provisional application No. 60/067,505, filed on Dec. 4, 1997, and provisional application No. 60/228,578, filed on Aug. 29, 2000.

(51) Int. Cl.$^7$ .............................. G01V 1/46; G01V 1/48
(52) U.S. Cl. ........................................................ 702/9
(58) Field of Search .............................. 702/6, 7, 9, 10; 166/255.2; 175/45, 61; 73/152.46; 33/304.313, 324, 326, 304, 313

(56) References Cited

U.S. PATENT DOCUMENTS

| | | | |
|---|---|---|---|
| 3,753,296 A | 8/1973 | Van Steenwyk | 33/304 |
| 4,199,869 A | 4/1980 | Van Steenwyk | 33/302 |
| 4,433,491 A | 2/1984 | Ott et al. | 33/302 |
| 4,468,863 A | 9/1984 | Van Steenwyk | 33/304 |
| 4,471,533 A | 9/1984 | Van Steenwyk et al. | 33/302 |

(List continued on next page.)

FOREIGN PATENT DOCUMENTS

| | | |
|---|---|---|
| DE | 195 05 855 C1 | 2/1996 |
| EP | 0 175 298 A2 | 3/1986 |

OTHER PUBLICATIONS

Robert A. Estes et al., *Measurement–While–Drilling Gyroscopic Orientation Tool Requires Robust Adaptation of Latest Sensors and Electronics;* IEEE Conf. Int'l. Meas., Tech. Conf., May, 2000.

R. A. Estes et al., *Development of a Robust Gyroscopic Orientation Tool for MWD Operations,* SPE 63274, 2000 SPE Annual Technical Conference and Exhibition, Dallas, Texas, Oct. 1–4, 2000. pp. 1–13.

D. H. Titterton et al., *Strapdown inertial navigation technology,* IEE Radar, Sonar, Navigation and Avionics Series 5, 1997, pp. 270–272.

Primary Examiner—Donald McElheny, Jr.
(74) Attorney, Agent, or Firm—Madan, Mossman & Sriram, P.C.

(57) ABSTRACT

This invention provides a measurement-while-drilling (MWD) downhole assembly for use in drilling boreholes which utilizes gyroscopes, magnetometers and accelerometers for determining the borehole inclination and azimuth during the drilling of the borehole. With the present invention, a secondary borehole for secondary recovery operations may be drilled with accuracy in proximity to a cased producing borehole.

7 Claims, 14 Drawing Sheets

U.S. PATENT DOCUMENTS

| | | | |
|---|---|---|---|
| 4,472,884 A | 9/1984 | Engebretson | 33/304 |
| 4,559,713 A | 12/1985 | Ott et al. | 33/302 |
| 4,594,790 A | 6/1986 | Engebretson | 33/304 |
| 4,611,405 A | 9/1986 | Van Steenwyk | 33/304 |
| 4,706,388 A | 11/1987 | Van Steenwyk | 33/304 |
| 4,833,787 A | 5/1989 | Van Steenwyk | 33/302 |
| 4,909,336 A | 3/1990 | Brown et al. | 175/45 |
| 4,920,655 A | 5/1990 | Van Steenwyk | 33/304 |
| 5,155,916 A | 10/1992 | Engebretson | 33/302 |
| 5,432,699 A | 7/1995 | Hache et al. | 364/422 |
| 5,485,089 A * | 1/1996 | Kuckes | 324/346 |
| 5,657,547 A | 8/1997 | Uttecht et al. | 33/304 |
| 5,679,894 A | 10/1997 | Kruger et al. | 73/152.03 |
| 5,899,958 A | 5/1999 | Dowell et al. | 702/6 |
| 5,901,795 A * | 5/1999 | Tsao et al. | 175/45 |
| 5,983,163 A | 11/1999 | Waid et al. | 702/10 |
| 6,513,606 B1 * | 2/2003 | Krueger | 175/61 |
| 6,631,563 B2 * | 10/2003 | Brosnahan et al. | 33/313 |

* cited by examiner

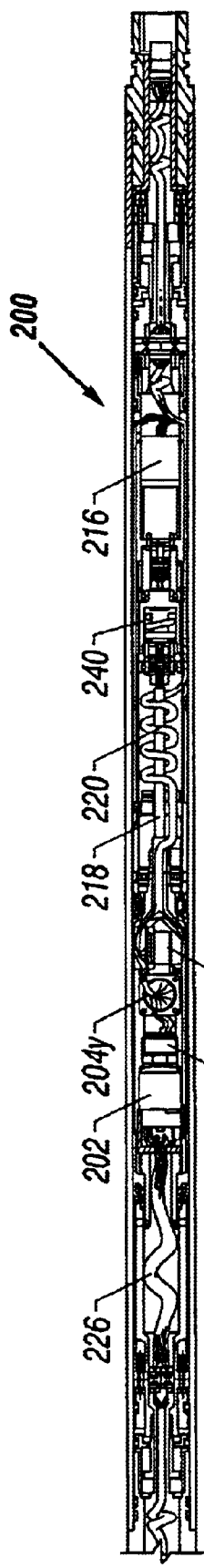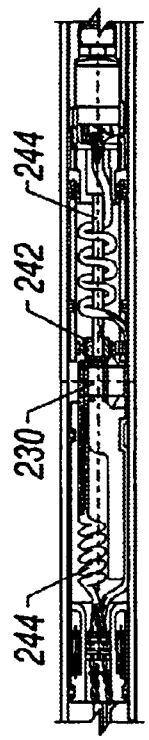
FIG. 2A
FIG. 2B

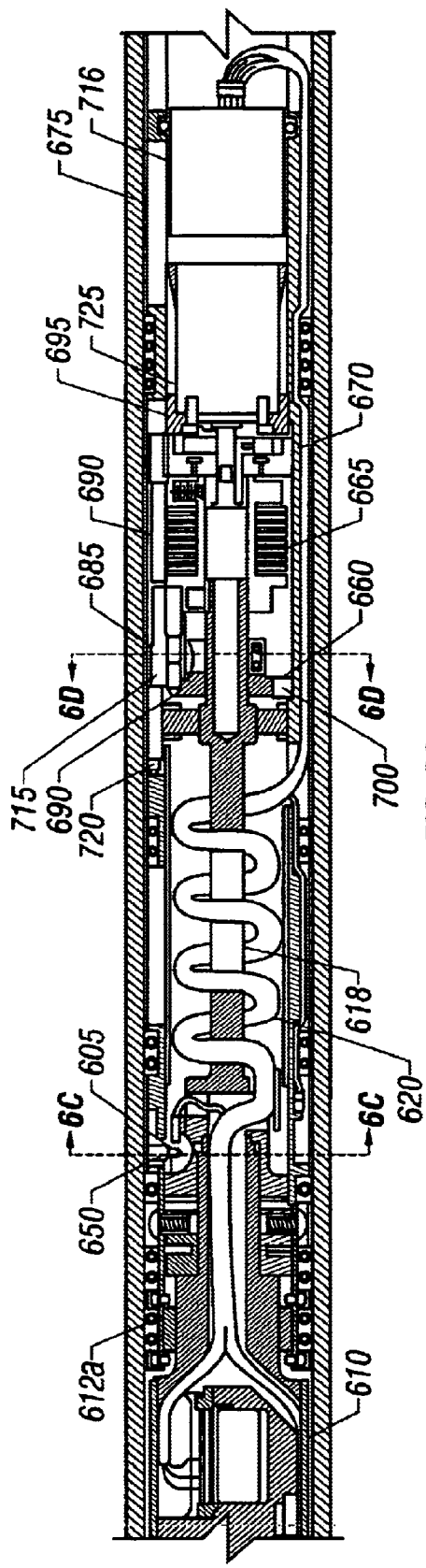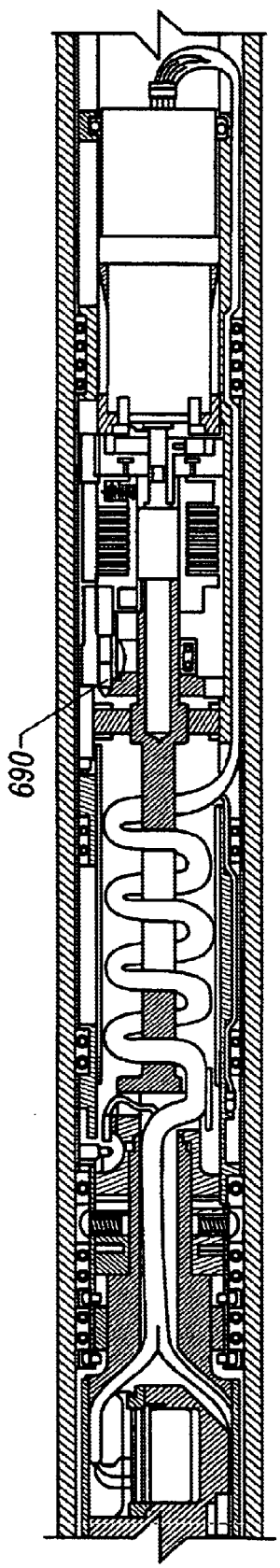
FIG. 6A
FIG. 6B

USE OF MWD ASSEMBLY FOR MULTIPLE-WELL DRILLING

CROSS REFERENCE TO RELATED APPLICATIONS

This application is a Divisional of U.S. patent application Ser. No. 09/669,759 filed Sep. 26, 2000, now U.S. Pat. No. 6,529,834 which is a Continuation-in-Part of U.S. patent application Ser. No. 09/204,908 filed on Dec. 3, 1998 (now U.S. Pat. No. 6,347,282) which has a priority date of Dec. 4, 1997 based upon U.S. Provisional Patent Application No. 60/067,505. U.S. patent application Ser. No. 09/669,759 also claims priority from U.S. Provisional Patent Application No. 60/228,578 filed on Aug. 29, 2000. The application is also related to U.S. Pat. No. 6,712,159 which is a divisional of U.S. patent application Ser. No. 09/669,759.

FIELD OF THE INVENTION

This invention relates generally to bottom hole assemblies for drilling oilfield wellbores and more particularly to the use of gyroscopic and other sensors to determine wellbore direction during the drilling of the wellbores and to the correction of data from such sensors.

BACKGROUND OF THE INVENTION

To obtain hydrocarbons such as oil and gas, wellbores (also referred to as the boreholes) are drilled by rotating a drill bit attached at the end of a drilling assembly generally referred to as the "bottom hole assembly" or the "drilling assembly." A large portion of the current drilling activity involves drilling highly deviated and substantially horizontal wellbores to increase the hydrocarbon production and/or to withdraw additional hydrocarbons from the earth's formations. The wellbore path of such wells is carefully planned prior to drilling such wellbores utilizing seismic maps of the earth's subsurface and well data from previously drilled wellbores in the associated oil fields. Due to the very high cost of drilling such wellbores and the need to precisely place such wellbores in the reservoirs, it is essential to continually determine the position and direction of the drilling assembly and thus the drill bit during drilling of the wellbores. Such information is utilized, among other things, to monitor and adjust the drilling direction of the wellbores.

In the commonly used drilling assemblies, the directional package commonly includes a set of accelerometers and a set of magnetometers, which respectively measure the earth's gravity and magnetic field. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle.

The earth's magnetic field varies from day to day, which causes corresponding changes in the magnetic azimuth. The varying magnetic azimuth compromises the accuracy of the position measurements when magnetometers are used. Additionally, it is not feasible to measure the earth's magnetic field in the presence of ferrous materials, such as casing and drill pipe. Gyroscopes measure the rate of the earth's rotation, which does not change with time nor are the gyroscopes adversely affected by the presence of ferrous materials. Thus, in the presence of ferrous materials the gyroscopic measurements can provide more accurate azimuth measurements than the magnetometer measurements.

U.S. Pat. No. 5,432,699 discloses a method and apparatus measuring motion signals of gyroscopes in downhole instruments used to determine the heading of a borehole. Accelerometer and magnetometer data along three orthogonal axes of a measurement sub are used to obtain unit gravitational and magnetic vectors. The gyroscope measurements are used to correct the magnetic and gravity measurements made by the magnetometer and the accelerometer respectively. The calculations performed in the correction process by this, and other prior art optimization schemes based upon least squares methods, are valid when the measurements are corrupted by random additive noise. As would be known to those versed in the art, in the presence of systematic measurement errors, such least-squares optimization methods are unreliable.

Commercially available gyroscopes contain systematic errors or biases that can severely deteriorate accuracy of a gyroscope's measurements and thus the azimuth. Gyroscopes have been utilized in wireline survey applications but have not found commercial acceptance in the measurement-while-drilling tools such as bottomhole assemblies.

In wireline applications, the survey tool is conveyed into the wellbore after the wellbore has been drilled, in contrast to the MWD tools wherein the measurements are made during the drilling of the wellbores. Wireline methods are not practical in determining the drilling assembly position and direction during the drilling of the wellbores. In wireline applications, the gyroscopes are used either in a continuous mode or at discrete survey intervals. Wireline survey methods often make it unnecessary to employ techniques to compensate for the present-value of the gyroscope biases. In wireline applications, the gyroscope can be powered-up at the surface and allowed to stabilize (thermally and dynamically) for a relatively long time period. Typically a warm-up period of ten (10) minutes or more is taken. The power to the gyroscope is continuously applied from the beginning at the surface, through the actual wellbore survey and through the final check of the survey tool at the surface at the end of the survey. Therefore, reference alignments can be made at the surface prior to commencing the wellbore survey to adjust or verify the alignment accuracy of the north-seeking gyroscope. The initial independent reference can then be used at the end of the wireline survey. Any bias in the gyroscope in a wireline tool can be measured at the surface by taking the difference in the alignments at the beginning and the end of the survey runs. Furthermore, the wireline tool carrying the gyroscope can easily be rotated at the surface to several different toolface (roll angle) positions to determine the bias present on either of the transverse gyroscopes (i.e., along the x and y axis of the tool) when the tool is at the surface. This bias can be used to verify the accuracy or to correct the gyroscope measurements.

In the MWD environment, the above-noted advantages of the wireline systems are not present. The MWD surveys are usually taken during drill pipe connection times during the drilling of the wellbore, which intervals are relatively short—generally one or two minutes. Power in the MWD tools is generated downhole and/or provided by batteries. To conserve the power, it is desirable to switch off the gyroscopes when not in use because the gyroscopes consume considerable power. For MWD tools utilizing turbine-alternator, the power is generated by flow of the drilling fluid ("mud") which is interrupted at each pipe connection. Even if the power could be applied continuously, the difference in the bias measured at the surface prior to the drilling and post drilling is not considered an accurate measure due to the very long time between drilling assembly trips, which are typically between 30 and 300 hours.

Bias stability from turn-on to turn-on is a major error component for the currently available tactical grade gyroscopes. Removing the bias by rotating the gyroscopes about a vertical axis (long axis) has been utilized in non-drilling applications. Toolface orientation positioning of a bottomhole assembly during the drilling of the wellbores often is not a control variable that can be changed as desired. The depth, hole angle, tool deviation, and borehole condition often limit the ability to acquire sensor data at various roll angles of the bottomhole assembly in the wellbore. Thus, it is important to ensure that gyroscopes used for MWD measurements are bias compensated in real time internally prior to taking measurements at each interval. This can be achieved by determining and removing the biases in the gyroscope in the transverse plane using an internal indexing mechanism in the process of taking measurements downhole at each drilling interval. Biases may also be present in the other measurements, i.e., those made by magnetometers and accelerometers, for the same reasons as discussed above with reference to gyroscopes. It is desirable to remove these biases as well in order to obtain accurate survey information.

U.S. patent application Ser. No. 09/204,908 to Estes et al, having the same assignee as the present application and the contents of which are fully incorporated herein by reference, discloses a method for estimation and removal of bias in a downhole MWD device. The downhole assembly disclosed therein includes at least one gyroscope that is rotatably mounted in a tool housing to provide signals relating to the earth's rotation. A device in the tool can rotate the gyroscope within the tool at any desired degree. In one embodiment of the invention, a processor in the tool combines measurements from the gyroscope taken at two opposing positions at the same depth to determine the systematic bias in the gyroscope before further processing of the signals. In another embodiment of the invention, the tool includes magnetometers and accelerometers so that biases in measurements made by these instruments can also be determined. Additionally, using a plurality of axially spaced apart magnetometers, the magnetic gradient may also be determined, making it possible to correct for local magnetic sources. In another embodiment of the invention, the processor combines measurements taken from accelerometers in the MWD tool to provide gravity measurements from which the toolface and inclination are determined. The unbiased gyroscopic measurements are used in conjunction with the toolface and inclination measurements to determine the azimuth and true north toolface. The present invention provides bottomhole assemblies that utilize gyroscopes, accelerometers and magnetometers for determining the position and direction of the bottomhole assembly and wherein the biases in the gyroscope, the magnetometer and the accelerometer in the transverse plane are determined and removed downhole during the drilling operations. Once these biases are removed, methods can be used for correction of the measured data based upon the fact that there is a redundancy in the observations made using the three kinds of sensors.

The bottomhole assembly of Estes experiences severe rotational dynamics during the drilling process. It is desirable to be able to internally rotate the bottomhole sensors for bias correction measurements and then to mechanically lock them from rotational movement between correction measurements when the tool is in motion while the well is being drilled. During the period of tool motion, accelerometer and magnetometer measurements could desirably be made to provide continuous monitoring of the orientation of the bottom-hole assembly (BHA). Conventional devices utilize one motor to rotationally drive an instrument package and a separate motor or a solenoid to actuate a locking mechanism. This arrangement requires significant space and power in the downhole package. It would be desirable to have an apparatus that requires less space and power and makes it possible to determine the bias when the BHA is stationary It would also be desirable to have a gyro-MWD module that is retrievable and can be used in conjunction with a drilling liner system. With such an arrangement, the gyro-MWD module would not be subjected to the severe downhole conditions for an extended period of time.

SUMMARY OF THE INVENTION

The present invention is a method of using a gyro-MWD device to control the orientation of a borehole and maintain its position in a desired relation to a preexisting borehole. Such requirements are common in an injection wellbore used in secondary recovery operations for injecting a fluid such as steam, $CO_2$, water or a polymer in proximity to a perforated cased production wellbore. Due to the presence of casing, magnetometers cannot be used to maintain the desired relative position of the injection wellbore and the production wellbore. With the gyro-MWD device, a positional accuracy of three meters or less may be maintained while drilling the injection wellbore.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 2A shows a schematic diagram of a portion of the bottomhole assembly with a set of gyroscopes and a corresponding set of accelerometers according to a preferred embodiment of the present invention;

FIG. 2B shows a schematic diagram showing the use of a second two-axis gyroscope in the bottomhole assembly shown in FIG. 2A;

FIG. 6A shows an embodiment of the invention showing a portion of the sensor system with a motor drive and locking apparatus in the locked position.

FIG. 6B shows the embodiment of FIG. 6A with the apparatus in the unlocked position.

DETAILED DESCRIPTION OF THE PREFERRED EMBODIMENTS

Figure 1:
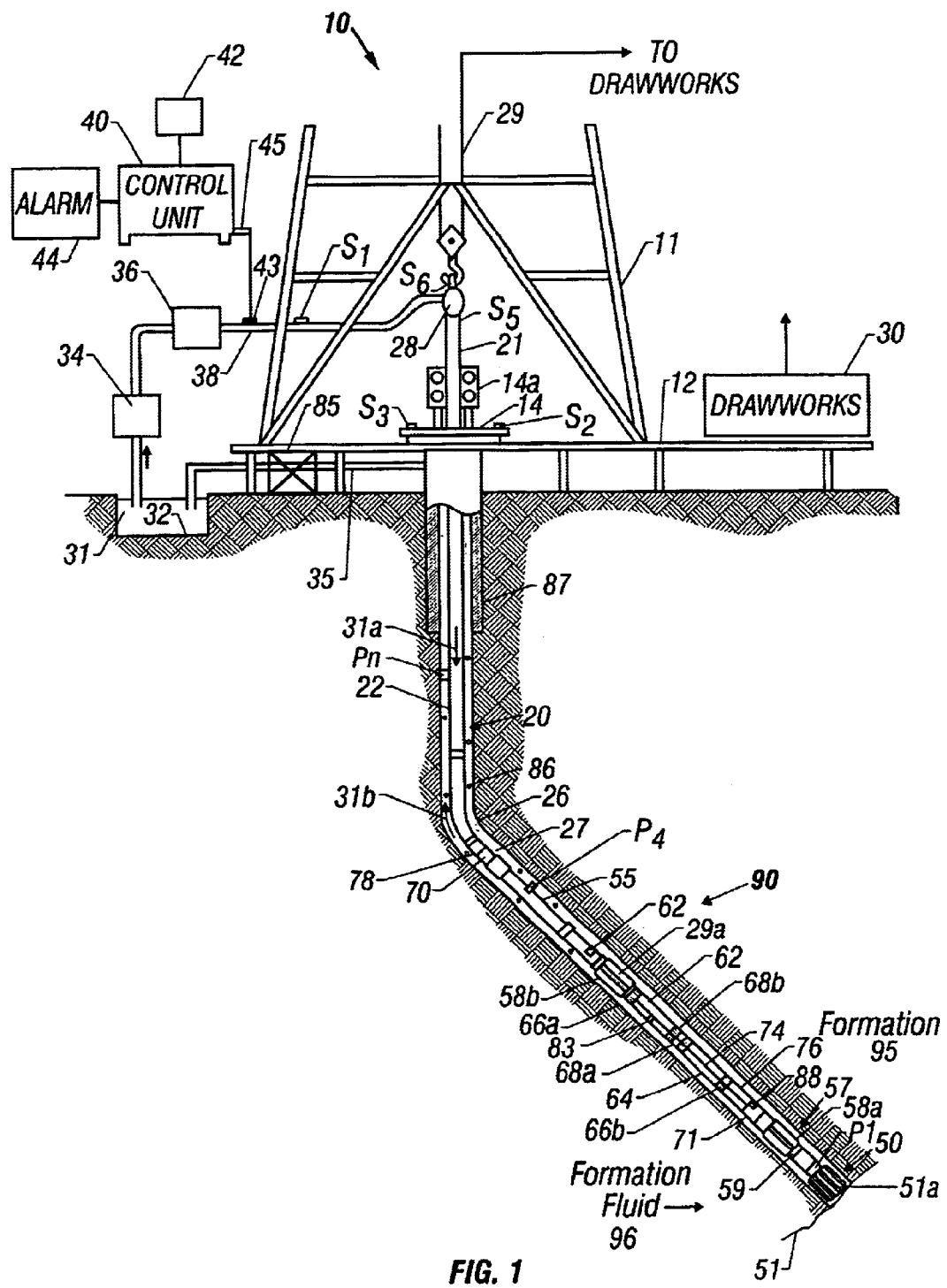
FIG. 1 shows a schematic diagram of a drilling system that employs the apparatus of the current invention in a measurement-while-drilling embodiment.

FIG. 1 shows a schematic diagram of a drilling system 10 having a bottom hole assembly (BHA) or drilling assembly 90 that includes gyroscope(s) according to the present invention. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or a gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

A number of sensors are also placed in the various individual devices in the drilling assembly. For example, a variety of sensors are placed in the mud motor power section, bearing assembly, drill shaft, tubing and drill bit to determine the condition of such elements during drilling and to determine the borehole parameters. The preferred manner of deploying certain sensors in drill string 90 will now be described. The actual BHA utilized for a particular application may contain some or all of the above described sensors. For the purpose of this invention any such BHA could contain one or more gyroscopes and a set of accelerometers (collectively represented herein by numeral 88) at a suitable location in the BHA 90. A preferred configuration of such sensors is shown in FIG. 2A.

FIG. 2A is a schematic diagram showing a sensor section 200 containing a gyroscope 202 and a set of three accelerometers 204x, 204y and 204z disposed at a suitable location in the bottomhole assembly (90 in FIG. 1) according to one preferred embodiment of the present invention. The gyroscopes 202 may be a single axis gyroscope or a two-axis gyroscope. In vertical and low inclination wellbores, an x-axis and a y-axis gyroscope are deemed sufficient for determining the azimuth and toolface with respect to the true north. The configuration shown in FIG. 2A utilizes a single two-axis (x-axis and y-axis) gyroscope that provides outputs corresponding to the earth's rate of rotation in the two axis (x-axis and y-axis) perpendicular to the borehole axis or the bottomhole assembly longitudinal axis, referred to herein as the z-axis. The sensor 202 thus measures the earth's rotation component in the x-axis and y-axis. The accelerometers 204x, 204y and 204z measure the earth's gravity components respectively along the x, y, and z axes of the bottomhole assembly 90.

The gyroscope 202 and accelerometers 204x–204z are disposed in a rotating chassis 210 that rotates about the radial bearings 212a–212b in a fixed or non-rotating housing 214. An indexing drive motor 216 coupled to the rotating chassis 210 via a shaft 218 can rotate the chassis 210 in the bottomhole assembly 90 about the z-axis, thus rotating the gyroscopes 202 from one mechanical position to another position by any desired rotational angle. A stepper motor is preferred as the indexing drive motor 216 because stepper motors are precision devices and provide positive feedback about the amount of rotation. Any other mechanism, whether electrically-operated, hydraulically-operated or by any other desired manner, may be utilized to rotate the gyroscopes within the bottomhole assembly 90. The gyroscope 202 may be rotated from an initial arbitrary position to a mechanical stop (not shown) in the tool or between two mechanical stops or from an initial peak measurement to a second position as described later. The rotational angle corresponding to a particular axis is selectable.

Although FIG. 2A shows a single two axis gyroscope, a separate gyroscope may be utilized for each axis. A wiring harness 226 provides power to the gyroscope 202 and accelerometers 204x, 204y, 204z. The wiring harness 226 transmits signals from the gyroscope and accelerometers to the processor in the bottomhole assembly 90. Similarly, a suitable wiring harness 220 provides power and signal linkage to the stepper motor 216 and additional downhole equipment. A spring loaded torque limiter 240 may be used to prevent inertial loading caused by drillstring rotation from damaging the gearbox of the stepper motor 216.

In addition a second two-axis (x-axis and z-axis) gyroscope 230 may be rotatably mounted in the bottomhole assembly 90 in a rotating chassis or in any other manner to measure the rate of rotation in the z-axis and the x-axis, as shown in FIG. 2B. The sensor 230 could be rotated about the y-axis using a bevel gear 242 and a shaft linkage 244 to the rotating chassis 210, thus eliminating the need for an additional motor. The wiring harness 244 for the y-axis gyro 230 must be spooled around the gyro to accommodate the space available in a small diameter housing.

As noted above, an MWD gyroscope requires optimization and/or compensation for several parameters in order to provide the required performance from typical gyroscopic sensors currently available.

One of the error parameters that in some cases is too large for adequate accuracy performance in a typical adaptation of an MWD Gyroscope is the bias on the gyroscope's output. Some gyroscopes have small error values for the "bias random walk" term, and relatively stable bias values after an initial warm-up period, but have a large instability in the bias seen from turn-on to turn-on. The bias and bias random walk largely determine the accuracy of a gyroscope sensor used in the gyrocompass (North-Seeking) mode of operation. An apparatus and a method to correct for the bias error seen after power is applied during drilling is desirable.

One embodiment of the invention accomplishes compensation for the systematic bias error in a gyroscope in an MWD tool by indexing the gyroscope to two positions 180 degrees apart and by using data from these positions to determine the bias. Adding the two measurements results in a cancellation of the positive-going and negative-going signals and a doubling of the bias error. If all other parameters are compensated by a calibration process done prior to the operation of the bottomhole assembly the remaining error in the gyroscope (the bias) is removed after calculation as follows:

$$\text{Bias} = \tfrac{1}{2}((\text{"zero" reading}) + (\text{"180" reading})) \quad (1)$$

Mechanical stops can be used to rotate the gyroscope to an arbitrary "zero" position, and then to the "180" position. For a single axis gyroscope, this technique can determine the bias, which is then used to compensate subsequent measurements from the gyroscope, in addition to the previously determined calibration parameters. For a 2-axis gyroscope, the technique of indexing from the "zero" position to the "180" position can provide a measurement of the bias for each of the two (X and Y) transverse axis gyroscopes. Alternatively, a stepper motor or a drive motor with an angular resolver could be used to index 180 degrees from an arbitrary initial position on the rotating axis.

Figure 2C:
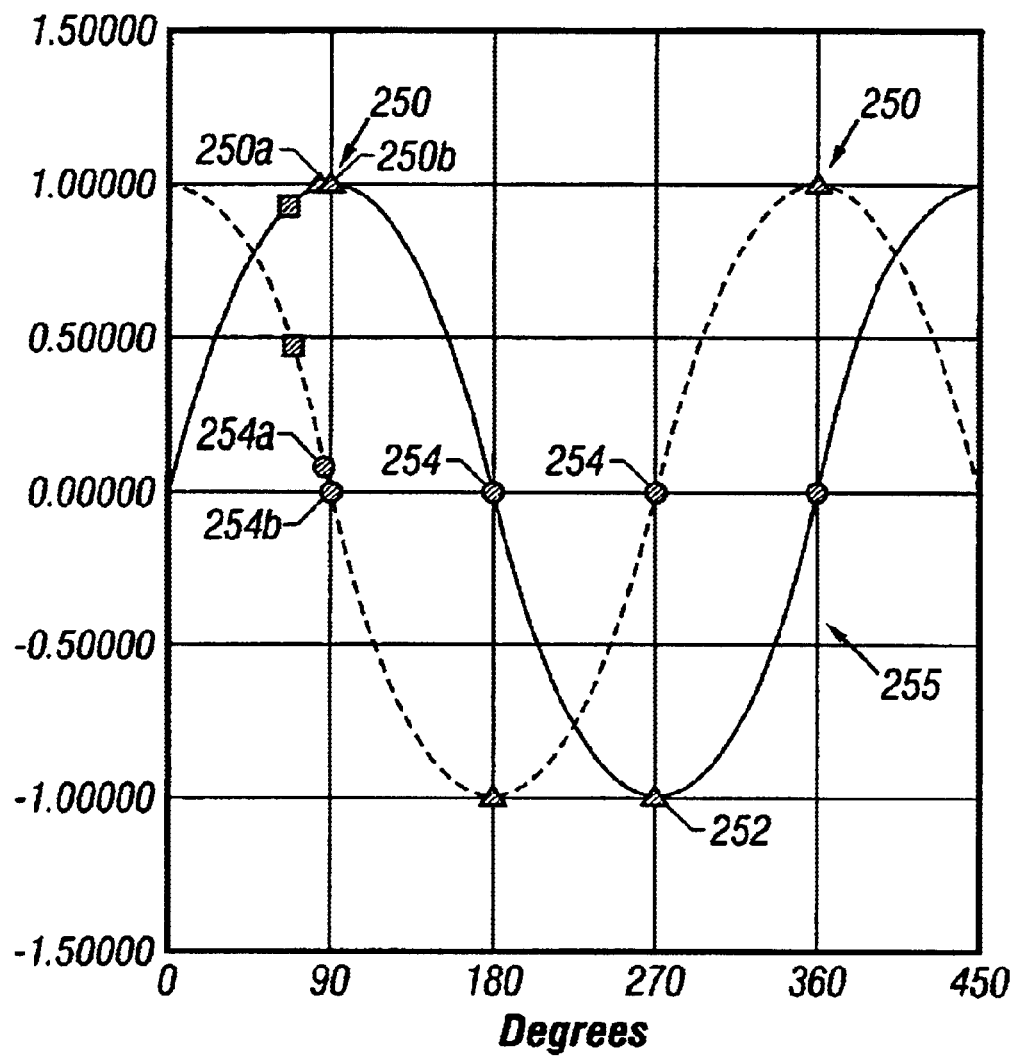
FIGS. 2C and 2D are graphs showing sinusoidal output of a two-axis gyroscope.

This technique is illustrated in the graph shown in FIG. 2C by the small square symbols designated "Initial Measurement Point". This position is shown at 62 degrees on the horizontal axis of the chart, corresponding to a relative roll angle (or toolface angle) of 62 degrees. A second measurement could then be obtained at 62+180, or 242 degrees, and the bias computed for Gyroscope X or Gyroscope Y or both from the measurements at these two positions.

But this technique of taking the first measurement at an arbitrary roll angle position on the graph could result in a gyroscope output occurring near null (zero on the vertical axis.) In such a case, the output of the gyroscope has a steep slope, and is very sensitive to variations in the position along the horizontal axis. To get good results, the indexing from the "zero" point to the "180" point should be done with great precision, and a tight tolerance on the 180 degree movement must be maintained. This tight tolerance on a mechanical indexing apparatus can be difficult to achieve in an MWD device, because of the harsh environment, and the need to provide vibration and shock dampening mounting of the sensitive parts. Elastic mounts are often required, with adequate room for deflection under dynamic loads, and mechanical stops may be damaged by continuous impacts.

Still referring to FIG. 2C, the present invention provides a method of establishing the initial "zero" reference position to minimize the bias measurement errors, while allowing for a less precise mechanical indexing apparatus. Referring to FIG. 2C, it is clear that the output of the gyroscope is less sensitive to angular positioning errors near the peak positive (250) and negative (252) portions of the sinusoidal wave 255. The round points 254a and 254b plotted near the null value of the sine wave at 85 and 90 degrees have significantly more vertical displacement that the triangular points 250a and 250b plotted near the peak of the sine wave 255. In a preferred embodiment of the invention, the "zero" position is established near the positive or negative peaks. This can be accomplished by monitoring the output of the gyroscope while rotating. Finding the peak may be done by looking for the position where the slope of the output goes from rising to falling (or vice versa) with increasing angular position. The initial "zero" position measurements can be made at this position and saved for subsequent computation. The drive motor apparatus can then be commanded to make measurements at additional rotational positions relative to the initial position. Measuring at +180° provides the minimum value for the X-axis. Measuring at ±90° provides the maximum and minimum values for the Y-axis. Applying equation (1) to these measurements determines biases for X and Y that are optimized to reduce errors related to indexing error.

Having determined the bias in the two axes by this downhole calibration technique, the outputs of the X and Y axes can then be corrected for this bias at any position on the angular (horizontal) scale. Angular parameters of interest for the downhole MWD assembly (Azimuth and Toolface) can then be computed using values at all 4 or at any of the previously recorded or subsequent indexed positions.

In summary, the triangular points plotted near the peaks of the sinusoids are used to compute the biases, and then after compensation, these measurements along with the measurements made at the round points plotted near the null values of the sinusoids are used to compute the angular parameters of interest.

Referring back to FIG. 2A, in operation, to determine the toolface, inclination angle and the azimuth of the bottomhole assembly 90, the drilling is interrupted or stopped. The gyroscope is powered and the earth rate measurements from the gyroscope 202 and gravity measurements from each of the accelerometers 204x–204z are taken. As noted-above the gyroscope rate measurements contain systematic biases or errors. To eliminate these systematic errors, a second set of rate measurements are made after rotating the gyroscopes 202 180 degrees at the same wellbore depth and bottomhole assembly position and without switching off the power to the gyroscope 202.

The measurements relating to each axis from the gyroscope made at each position are then differenced to determine the respective biases. The bias corresponding to each axis is preferably stored in a suitable memory in the processor for later use. The biases are used to correct the gyroscopic measurements prior to determining the azimuth or toolface with respect to the true north in the manners described above. These methods largely remove the systematic independent toolface errors. The remaining errors are removed by utilizing predetermined models derived from laboratory measurements made at the surface.

Figure 2D:
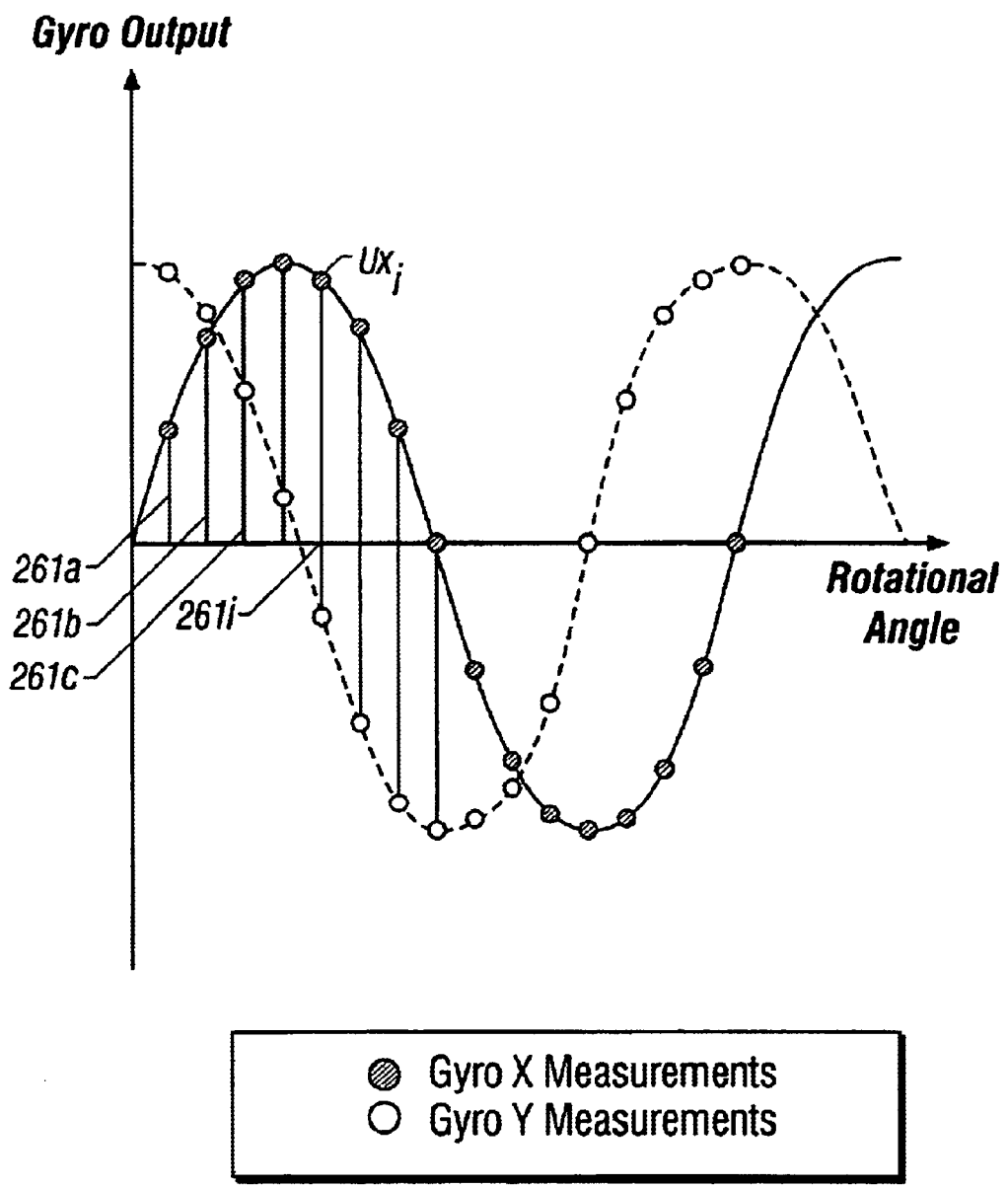

FIG. 2D illustrates another method of correcting for the gyro output. The tool is rotated successively through angles 261a, 261b, . . . and at each rotational angle, the gyro output of the X and Y axis gyros is taken. Denoting by $Ux_i$ the measurement of the X gyro at an angle $\theta_i$, the measurements in the presence of random measurement errors $\epsilon_i$. a bias $b_x$ may be represented as $$Ux_i = A \sin(\theta_i + \phi) + b_x + \epsilon_i \qquad (3)$$

where $\phi$ is a phase angle and A is the amplitude of the sinusoid. This equation has three parameters to be estimated, namely A, $\phi$, and $b_x$. If measurements are made at three tool rotational angles, these parameters are uniquely determined. If additional measurements are made, then the equations are overdetermined and a solution may be obtained in a least squares sense using methods known in the art. The same procedure may also be used for the measurements made by the Y axis gyro. When both the X and Y axis gyro measurements are used, then there is an additional requirement that the phase term for the x and y directions differ by 90°. This too can be made part of the least squares minimization procedure.

Using a precision stepper motor to index the rotatable sensor housing has the advantage that a precise and arbitrary increment of rotation can be accomplished. No matter what the initial rotation angle (e.g. $\theta_i$ or $261_i$ on FIG. 2D) is, the sensor can be rotated from this initial position in multiple predefined increments. By this method, it is easy to acquire, for example measurements at ±30° and ±60° from the initial position ($\theta_i$). Using small increments from the initial position minimizes the time required to index to these positions. It also minimizes the allowable rotational degree of freedom that must be designed into the wiring harness. The measured values and known associated phase angles are then used in conjunction with eq. (3) to solve for the best sinusoidal solution. The bias is then optimally determined as the "b" term of this equation.

Figure 2E:
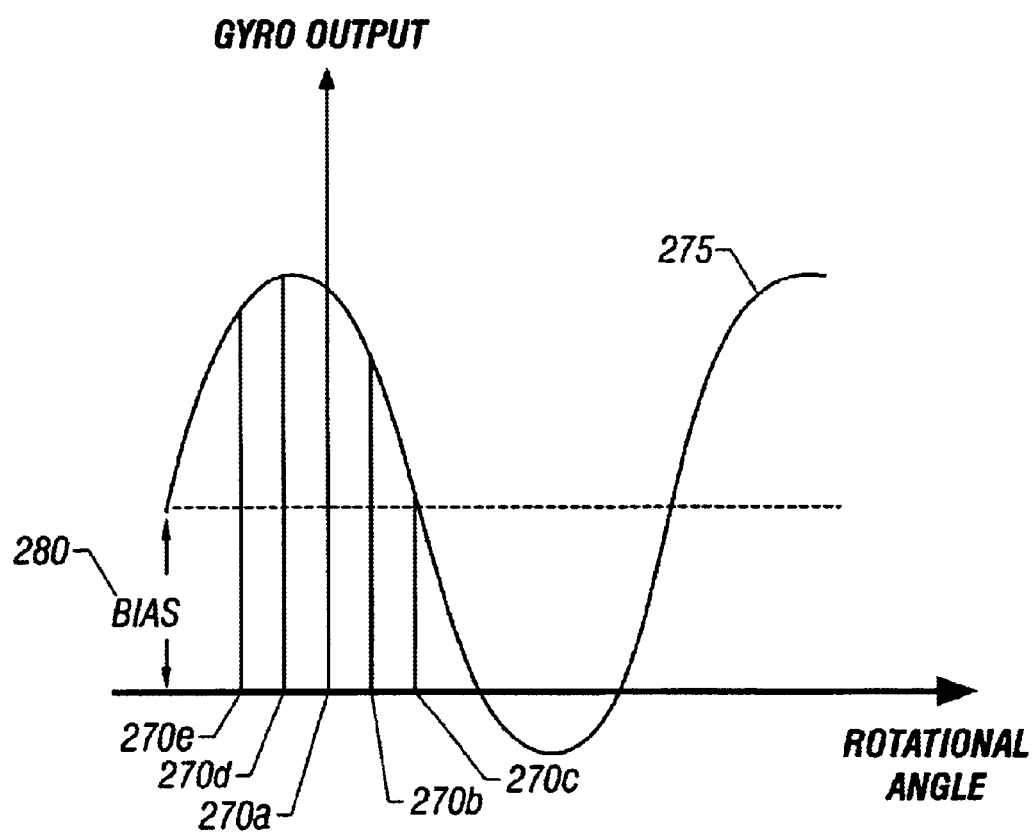
FIG. 2E shows the indexing method used in a preferred embodiment of the present invention.

This procedure is illustrated in FIG. 2E wherein a more realistic case with a large bias 280 is indicated. In reality the bias may be several volts while the amplitude of the sinusoid is of the order of a few millivolts. The output 275 of one of the gyros is shown, and starting from an initial arbitrary rotational position 270a, measurements are taken at ±30° (270b, 270d) and at ±60° (270c, 270e).

The above-described bias removal methods in realtime downhole during the drilling of the wellbores, referred hereto as the "mechanical-indexing methods," for gyroscopes allow great flexibility of use, minimizing the survey time and power consumption. It allows the determination of the systematic bias errors that typically exist in commercially available gyroscopes, rather than relying on the stability of the bias for such gyroscopes. This further allows the use of gyroscopes that are otherwise unsuitable for use in gyrocompass mode in the MWD environment due to their poor stability or large turn-on to turn-on bias instability. The other term affecting the accuracy of gyroscopic measurement, namely the random walk, is minimized (a) by selecting gyroscopes with relatively low value of random walk by performing tests at the surface prior to their use in the bottomhole assembly and (b) averaging the measurements of the gyroscopes for sufficiently long time periods to remove the statistical variations of such errors.

Figure 3:
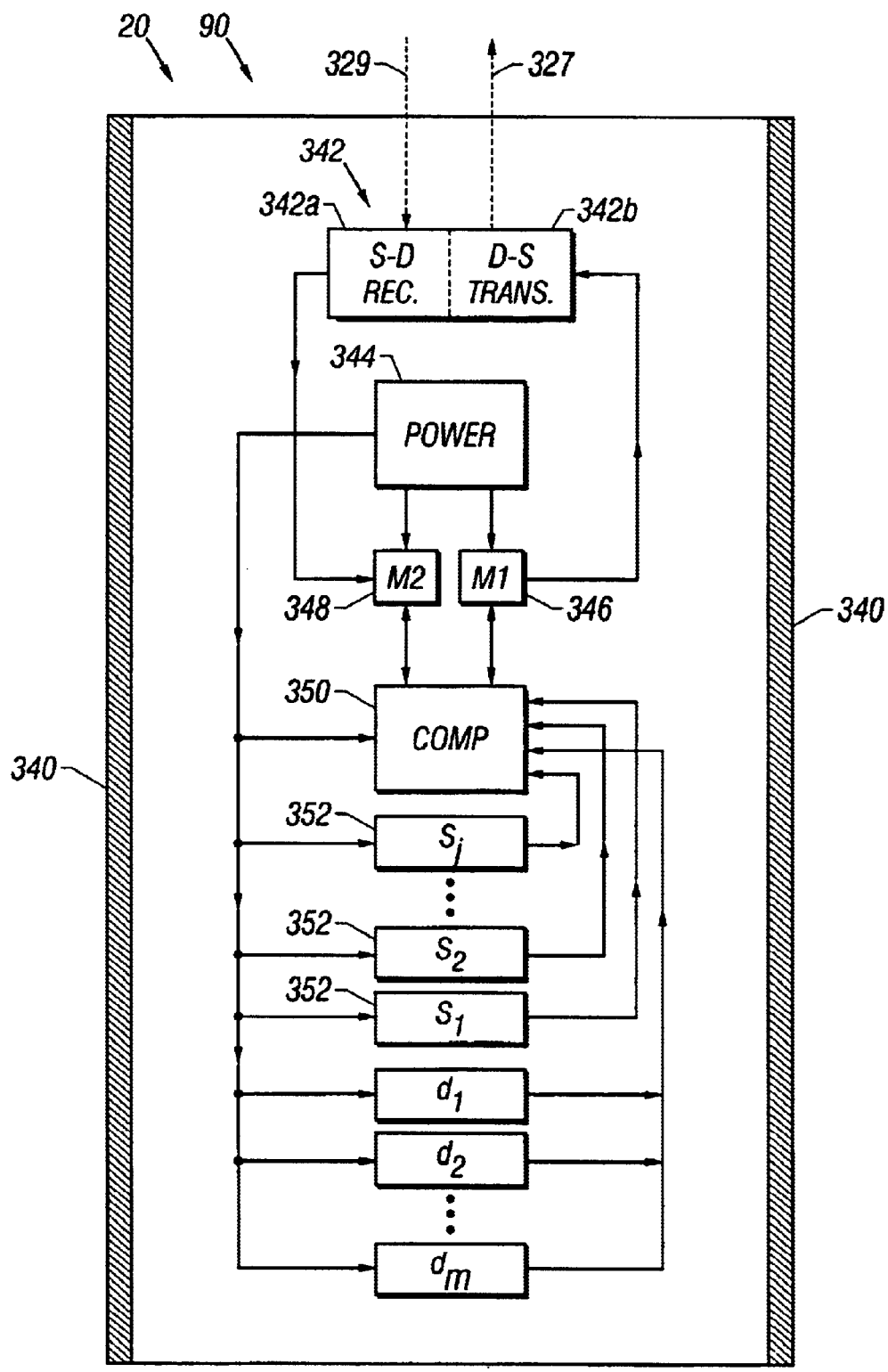
FIG. 3 shows a functional block diagram of the major downhole elements of the system of the present invention.

FIG. 3 shows a functional block diagram of the major elements of the bottom hole assembly 90 and further illustrates with arrows the paths of cooperation between such elements. It should be understood that FIG. 3 illustrates only one arrangement of the elements and one system for cooperation between such elements. Other equally effective arrangements may be utilized to practice the invention. A predetermined number of discrete data point outputs from the sensors 352 ($S_i$–$S_j$) are stored within a buffer which, in FIG. 3, is included as a partitioned portion of the memory capacity of a computer 350. The computer 350 preferably comprises commercially available solid state devices which are applicable to the borehole environment. Alternatively, the buffer storage means can comprise a separate memory element (not shown). The interactive models are stored within memory 348. In addition, other reference data such calibration compensation models and predetermined drilling path also are stored in the memory 348. A two way communication link exists between the memory 348 and the computer 350. The responses from sensors 352 are transmitted to the computer 350 and or the surface computer 40 wherein they are transformed into parameters of interest using methods which will be detailed in a subsequent section hereof.

The computer 350 also is operatively coupled to certain downhole controllable devices d1–dm, such as a thruster, adjustable stabilizers and kick-off subassembly for geosteering and to a flow control device for controlling the fluid flow through the drill motor for controlling the drill bit rotational speed.

The power sources 344 supply power to the telemetry element 342, the computer 350, the memory modules 346 and 348 and associated control circuits (not shown), and the sensors 352 and associated control circuits (not shown). Information from the surface is transmitted over the downlink telemetry path illustrated by the broken line 329 to the downhole receiving element of downhole telemetry unit 342, and then transmitted to the storage device 348. Data from the downhole components is transmitted uphole via link 327. In the present invention, the parameters of interest such as toolface, inclination and azimuth are preferably computed downhole and only the answers are transmitted to the surface.

Figure 4:
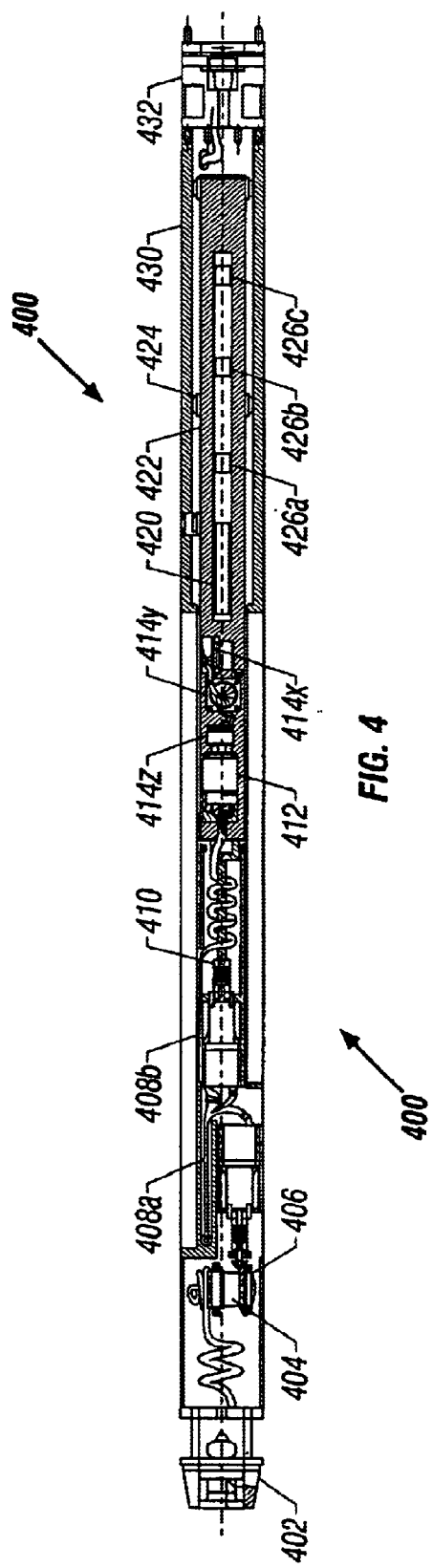
FIG. 4 shows an embodiment of the invention using two motors to drive two gyros, one of which is coupled to the magnetometers and the accelerometers.

FIG. 4 shows a sensor section 400 containing gyroscopes 404, 412, a set of three accelerometers 414x, 414y and 414z disposed at a suitable location in the bottomhole assembly 90 according to another embodiment of the present invention. The gyroscopes 404, 412 are preferably two-axis gyroscopes. The sensor section also contains three three-axis magnetometers 426a, 426b, and 426c. The instruments are enclosed in a housing 430 with a downhole coupler 432 and an uphole coupler 402. A stepper motor 408b drives the sensors 404, 412, 414x, 414y, 414z, 426a, 426b, and 426c downhole of the stepper motor 408b by a flex coupling 410 so that the sensors can be stepped through a series of azimuthal positions with respect to the tool axis. The magnetic sensors 426a, 426b, and 426c and the magnetometer board 420 are supported on a chassis 420 by non-magnetic bearings 424. With this arrangement, as the gyroscope 412 is stepped through a number of angles to determined its bias, the magnetometers and the accelerometers are being stepped in unison with the gyroscope. Using methods described above with reference to the gyroscope, the bias in the accelerometers 414x and 414y and the magnetometers 426a, 426b, and 426c can be determined and subsequent survey measurements can be compensated for this bias.

In the absence of local magnetic perturbations, such as those caused by steel objects in the sensor assembly or in the proximity of the sensor assembly, there should be no z-gradient of the magnetic field, i.e., the long axis components of magnetic sensors 426a, 426b, and 426c should all have the same value. If the actual measurements do not satisfy this condition, then it is indicative of a local magnetic disturbance. The magnetic field disturbance caused by a magnetic object in the borehole or in the vicinity of the borehole follows the well known inverse square law, and by using known modeling techniques, the location and the strength of the disturbance can be ascertained from a plurality of magnetic measurements. This makes it possible to correct the magnetometer measurements for the disturbance and also determine an axial distance along the borehole where the z-gradient is substantially zero and the magnetic field substantially undisturbed.

Still referring to FIG. 4, the sensor assembly also includes a second gyroscope 404 driven by a second stepper motor 408a through a bevel gear 406. Using the methodology described above, the bias of this gyro can also be determined during logging operations, the difference being that in this case, it is the y- and z-components of the bias that are determined by rotating the gyro 412 through a number of different angles and making measurements at each angle.

Once the observations have been corrected for bias, the three sets of measurements based upon the three types of sensors can be used to obtain an improved estimate of the tool orientation. As discussed in U.S. Pat. No. 5,432,699, the angular velocity $\Omega^g$ as measured by the gyroscopes is the sum of the angular velocity vector $\Omega^e$ of the earth and the angular velocity $\Omega^p$ of the tool relative to the earth $$\Omega^g = \Omega^e + \Omega^p \qquad (4).$$

The magnetometer and accelerometer measurements each give independent measurements of the motion of the tool relative to the earth. The equations denoted by (4) are overdetermined and may be solved to obtain an improved estimate of the actual orientation of the tool with respect to the earth using prior art methods. Since the magnetometer gives an orientation with respect to the earth's magnetic field, the method readily gives a measurement of the magnetic declination (angle between geographic and magnetic north).

Figure 5:
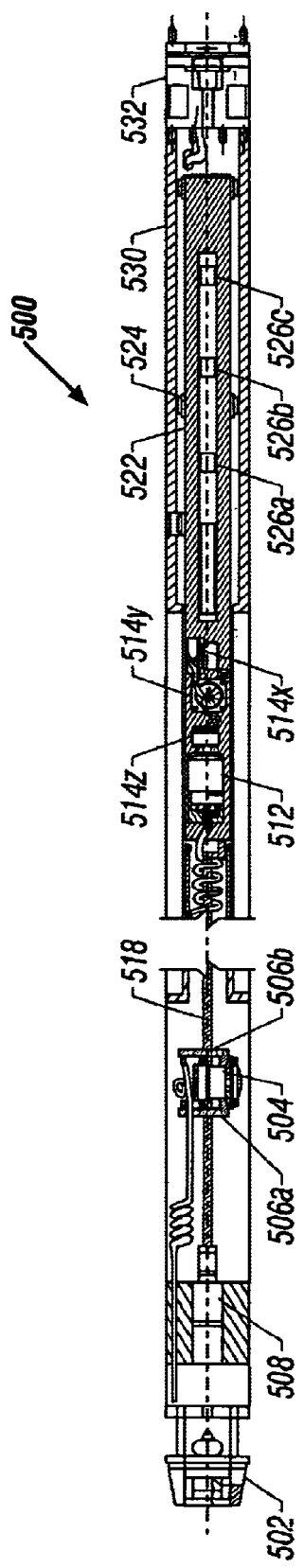
FIG. 5 shows an embodiment of the invention using a single motor to drive two gyros, one of which is coupled to the magnetometers and the accelerometers.

FIG. 5 shows another embodiment of the invention using two gyroscopes. The sensor section 500 contains gyroscopes 504, 512, and a set of three accelerometers 514x, 514y and 514z disposed at a suitable location in the bottomhole assembly 90. The gyroscopes 504, 512 are preferably two-axis gyroscopes. The sensor section also contains three three-axis magnetometers 526a, 526b, and 526c. The instruments are enclosed in a housing 530 with a downhole coupler 532 and an uphole coupler 502. A stepper motor 508 drives the transverse gyroscope 504 through a bevel gear 506a, the motion of the stepper motor being further transmitted through bevel gear 506b to a shaft 518. Sensors 512, 514x, 514y, 514z, 526a, 526b, and 526c are driven in synchronization with the gyroscopic sensor 504. The magnetic sensors 526a, 526b, and 526c and the magnetometer board 520 are supported on a chassis 522 by non-magnetic bearings 524. Using methods described above with reference to the gyroscope, the bias in the gyroscopes 504, 512, the accelerometers 514*x*, 514*y* and 514*z* and the magnetometers 526*a*, 526*b*, and 526*c* can be determined and subsequent survey measurements can be compensated for this bias. The bias corrected measurements are then used to obtain an improved estimate of the tool position and orientation using the method discussed above with reference to FIG. 4.

Figure 6C:
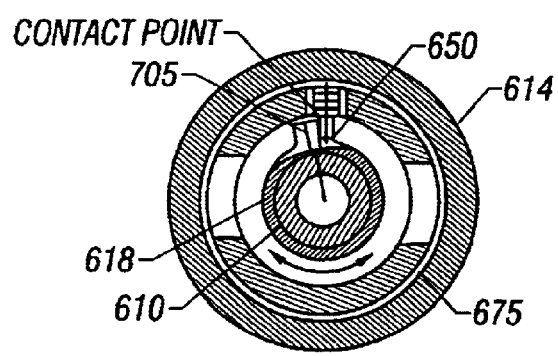
FIG. 6C shows a sectional view of the notched shoulder/stop pin arrangement of FIG. 6A.

FIG. 6A is a schematic diagram of an embodiment of the invention using a locking motor. Shown is a rotating instrument chassis 610 containing sensors as described above that rotates in fixed or non-rotating housing 614. A reversible indexing drive motor 616, coupled to the rotating instrument chassis 610 via a drive shaft 618 through a slip clutch 665, can rotate the chassis 610 in the bottomhole assembly 90 about the z-axis, thus rotating the gyroscope 602 and accelerometers 604*x*–604*z* from one mechanical position to another mechanical position by any desired rotational angle. A stepper motor is preferred as the reversible indexing drive motor 616 because stepper motors are precision devices and can provide positive feedback about the amount of rotation. Any other mechanism, whether electrically-operated, hydraulically-operated or by any other desired manner, may be utilized to rotate the gyroscopes within the bottomhole assembly 90. The drive motor 616 may be directly coupled with the slip clutch 665 or may be coupled through a suitable gear box 625 to the slip clutch 665.

Figure 6D:
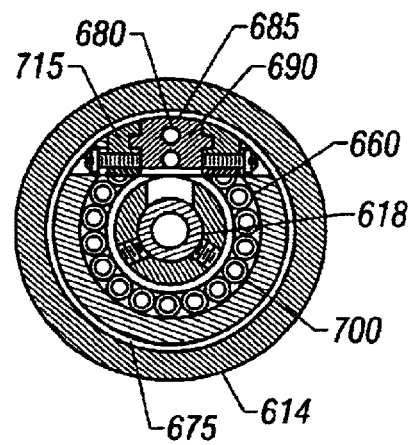
FIG. 6D shows a sectional view of the locking disk/locking pin arrangement of FIG. 6A.
Figure 6E:
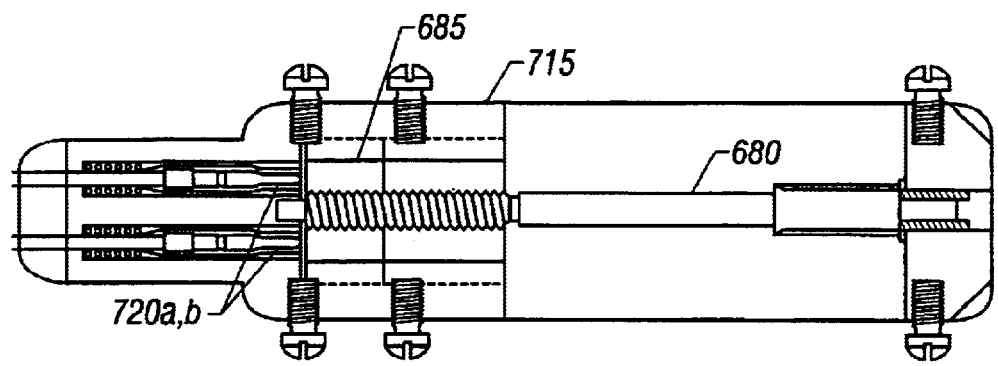
FIG. 6E shows a top view of the lead screw/trolley arrangement as shown in FIG. 6A.

A spur gear 670 is fixedly mounted on the motor shaft 695. A lead screw 680 is mounted in a slot in the motor chassis 675 and is offset from, and essentially parallel to, the rotational axis of the drive shaft 618. The lead screw 680 has a gear profile on one end so as to properly mesh radially with the spur gear 670. The lead screw 680 has a thread profile on the other end adapted to engage with a trolley 685, which is driven axially thereon by rotation of the lead screw 680. A locking pin 690 is mounted on the trolley 685. The trolley 685 is constrained to slide within a trolley guide 715, as shown in FIG. 6D and FIG. 6E. When the motor shaft 695 rotates, the spur gear 670, rotating with the motor shaft 695, engages the lead screw 680 and causes the lead screw 680 to rotate. As the lead screw 680 rotates, it meshes with the trolley 685 and drives the trolley 685 through the action of the lead thread cut into the lead screw 680 and the trolley 685. The direction of rotation of the reversible motor 616 thereby determines the direction of axial movement of the trolley 685 and the locking pin 690 thereon. A locking disk 660 is mounted on the drive shaft 618 and has at least one locking hole 700 drilled circumferentially into the locking disk 660. The locking disk 660 is axially located on the shaft 618 in a position to fully seat the locking pin 690 when the trolley 685 is in the locked position as shown on FIG. 6A. Two spring-energized electrical contact pins 720*a* and 720*b* are mounted on the trolley guide 715 so as to contact the trolley 685 when the trolley 685 is in the locked position. When the trolley 685 and the pins 720*a* and 720*b* make contact, an electrical circuit is formed.

In the preferred embodiment, the instrument chassis 610 is typically rotated between 0–360 angular degrees, the rotation being limited by the windup in the electrical wires to the sensors. To prevent over-rotation, a rotational stop-pin 650 is mounted in the motor chassis 675 and engages a notched shoulder 705 on the drive shaft 618 at the rotational limit, shown in FIG. 6A and FIG. 6C. Both the stop-pin 650 and the notched shoulder 705 are wired to close an electrical circuit on contact with each other.

The operation of the motor is best understood by starting in the locked position as shown in FIG. 6A. The drive motor 616 is rotated in a direction so as to slide the trolley 685 towards the right or unlocked position. While the locking pin 690 is still engaged in a locking hole 700, the drive shaft 618 is constrained from rotating and is slipped with respect to the motor shaft 695 through the slip clutch 665. The torque of the slip clutch 665 forces the edge of the locking hole 700 to press against the locking pin 690 as the locking pin 690 is being withdrawn from the locking hole 700. Therefore, the locking pin 690 has minimal angular clearance from the wall of the locking hole 700 at disengagement. As shown in FIG. 6B, when the locking pin 690 clears the locking hole 700 the drive shaft 618 begins to rotate the instrument chassis 610 to predetermined positions for sensor measurements.

At the end of the measurement sequence, it is desirable to return the instrument chassis 610 to the same angular orientation it had before the start of the measurement sequence. If the trolley 685 and locking pin 690 are driven back toward the locked position, the locking pin 690 will arrive at the edge of the locking hole 700, where it last separated contact with the locking disk 660. However, due to gear backlash and an accumulation of manufacturing tolerances, it is possible that a mis-alignment of the locking pin 690 and the locking hole 700 may occur and the locking pin 690 will not hit the locking hole 3700 but will instead contact the face of the locking disk 660. The following technique is used to eliminate this interference problem.

At the beginning or end of the measurement sequence described above, the motor 616 is driven in the unlocking direction slightly beyond the point where the notched shoulder 705 on the drive shaft 618 contacts the rotational stop-pin 650. This intentionally slips the slip clutch 665 sufficiently to back the trolley 685 and the locking pin 690 away from the locking disk 660 an amount at least equal to the angular displacement of one-half of the diameter of the locking hole 700. Therefore, when the trolley 685 is driven toward the locking disk 660, the notched shoulder 705 contacts the stop-pin 650 from the opposite angular direction stopping rotation of the drive shaft 618 and of the locking disk 660. The slip clutch 665 begins to slip and the trolley 685, with the locking pin 690, is driven forward such that the locking pin 690 engages the center of the locking hole 700.

In an alternate embodiment, where rotations of greater than 360 degrees are required, there is no positive rotational stop. The plurality of locking holes 700 are spaced sufficiently close to one another such that the locking pin 690 will automatically stab into one of the locking holes 700 while at virtually any rotational position. The stepper motor 616 is actuated a known number of steps, in the locking direction, which should result in the locking pin 690 becoming fully seated in a locking hole 700. When the locking pin 690 is fully seated, the contact pins 720*a*–*b* contact the trolley 685 and close an electrical circuit signaling the motor controller to cease actuation of the stepper motor 616. If the motor controller does not sense the circuit closure by the time the stepper motor 616 has actuated the known number of steps, the motor controller will reverse the motor 616, driving the locking pin 690 to a fully open position and reinitiate the locking sequence until a successful lock is indicated by a circuit closure.

Figure 7A:
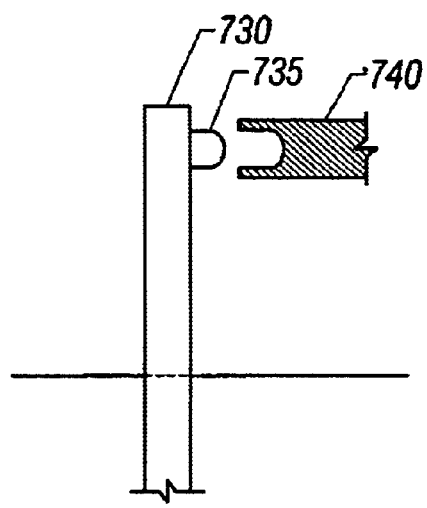
FIG. 7A shows an alternate embodiment of the locking disk and locking pin.

FIGS. 7A–7D show alternate embodiments for rotationally locking the shaft 618. FIG. 7A shows a locking disk 730 with a plurality of pins 735 protruding from the surface. These pins are mounted in a circumferential pattern on the disk 730 and are adapted to fit inside of locking pin 740 mounted on the trolley 685. The locking pin 740 has a hollow end adapted to closely fit over the pins 735 protruding from the locking disk 730. Other aspects of the locking and unlocking operation are as described above.

Figure 7B:
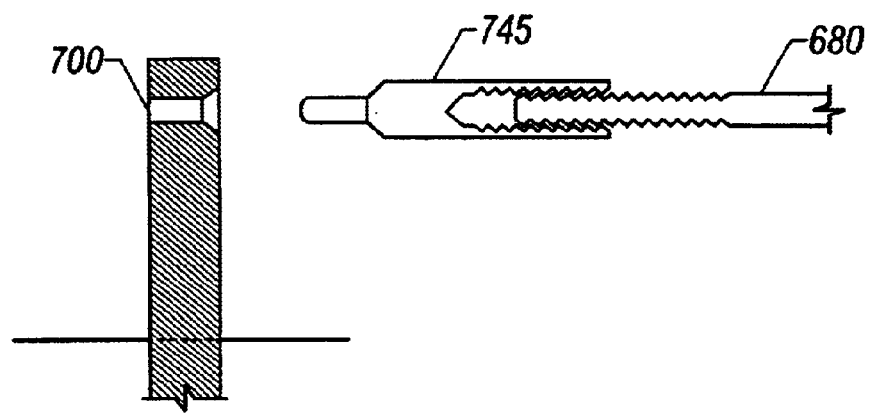
FIG. 7B shows one embodiment of a telescoping locking pin.

FIG. 7B shows a telescoping locking pin 745 internally threaded on one end and driven by the lead screw 680. The non-threaded end of the pin 645 is adapted to stab into any of the locking holes 700 on the locking disk 660.

Figure 7C:
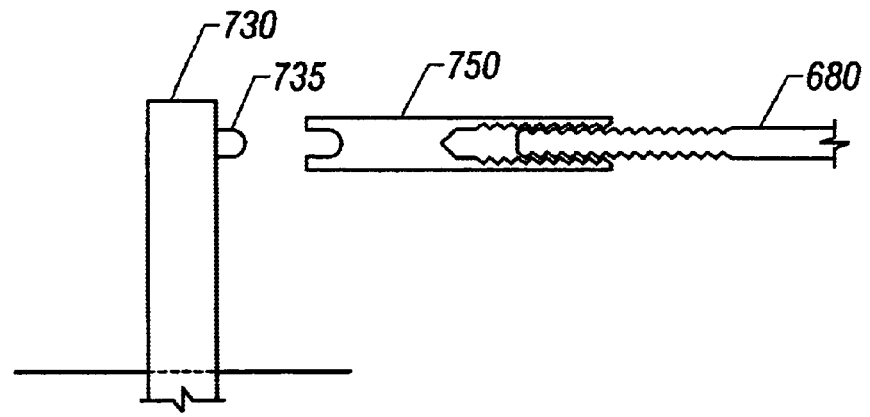
FIG. 7C shows a second embodiment of a telescoping locking pin.

FIG. 7C shows a telescoping locking pin 750 internally threaded on one end and driven by the lead screw 680. The non-threaded end of the pin 745 is adapted to fit over any of the locking pins 735 on the locking disk 730.

Figure 7D:
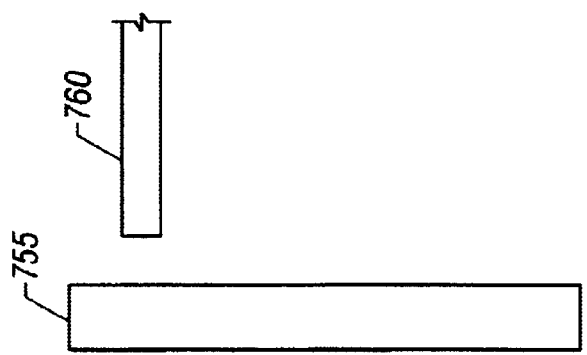
FIG. 7D shows an embodiment of the locking disk and locking pin adapted for frictional engagement.

FIG. 7D shows a locking pin 760 adapted to frictionally interface with the locking disk 755 with sufficient axial force so as to generate a sufficient frictional force between the pin 760 and the disk 755 to prevent rotation of the disk 755.

In an alternate embodiment of the invention, the indexing procedure is slightly modified. A first measurement is made at an arbitrary orientation of the housing. Subsequent measurements are made at ±30° and ±60°.

In one mode of operation of the tool, drilling is temporarily suspended and by using the indexing procedure discussed above, the bias in the instruments is determined and used to correct the measurements. From the corrected measurements, the BHA position and orientation is determined. By use of the locking arrangement, the chassis 210 is locked in place and drilling is resumed. During the drilling process, measurements continue to be made with the gyro, accelerometer and/or magnetometer and periodic updates of the BHA position and orientation are made using the determined bias. At the next suspension of drilling the indexing procedure is repeated and new biases in the gyro, accelerometer and magnetometers determined.

When used in conjunction with a BHA including a mud motor, the present invention may be used to steer the drilling direction. The gyro-MWD device is mounted on a non-rotating part of the BHA (not shown) and drilling is continued using the mud motor. The gyro-MWD device is used to determine orientation and azimuth of the borehole and the BHA and this information is used to control the direction of drilling.

U.S. Pat. No. 5,845,722 to Makohl et al and U.S. patent application Ser. No. 09/206,969, now U.S. Pat. No. 6,278,314, having the same assignee as the present application and the contents of which are fully incorporated herein by reference, discloses a drilling liner system for use in drilling through formations in which the pressure is significantly different from the pressure in the adjacent formations, and/or unstable formations make it difficult to protect the formation with a liner or casing in the hole. The drilling liner system comprises an inner string carrying an inner assembly having a pilot bit, and an outer assembly having a core bit. In one embodiment of the present invention, the gyro-MWD tool is conveyed on a retrievable assembly mounted in the drilling liner.

Figure 8:
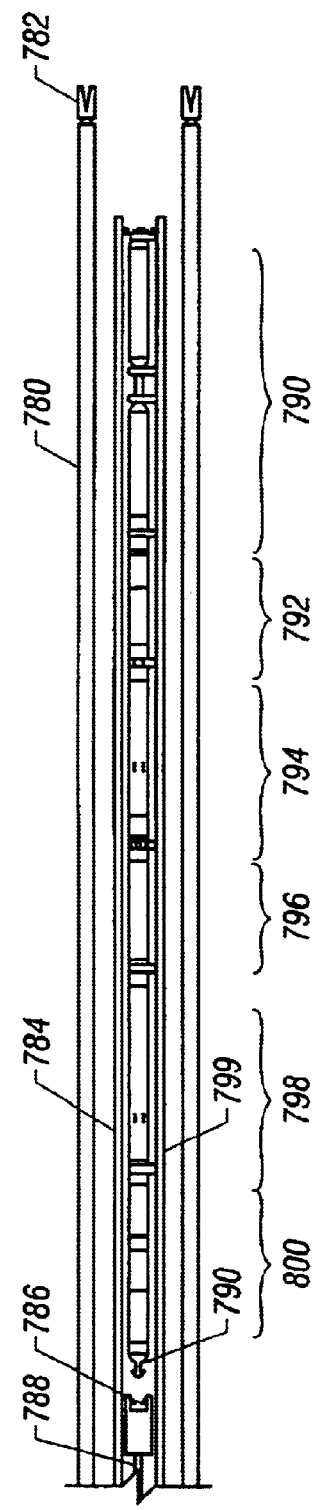
FIG. 8 shows the schematic arrangements of the Gyro-MWD device when used with a drilling liner.

Referring now to FIG. 8, a drillbit 782 at the end of a drilling liner 780 is shown. Inside the drilling liner 780 is an adapter tube for supporting the sensor assembly. The sensor assembly includes the Gyro-MWD sensors 790 as discussed above, the Gamma ray sensor 792, the Digital Attitude Sensor (DAS) assembly 794, the memory assembly 796, the battery assembly 798 and the pulser 800. To keep the illustration simple, supports for the adapter tube and the sensor units are not indicated. The sensor assembly may be retrieved using a wireline 788 and a fishing assembly 786–790.

The operation of the device shown in FIG. 8 is similar to that described above. The retrievable module is conveyed within the drilling liner and measurements are made as drilling progresses, with drilling being suspended at a first depth where the indexing operation is carried out. Once the borehole inclination and azimuth are determined as discussed above, drilling is resumed with the Gyro-MWD sensor assembly locked in place and additional measurements may be made with the sensors thereon while drilling is resumed. Drilling may be suspended at other depths and the process is repeated.

Once drilling has reached the desired depth with the drilling liner, the sensor assembly is retrieved while the adapter tube and the liner are left in place. Subsequent re-entry of the borehole with a smaller drill bit or drilling liner would require drilling out the adapter tube. For this reason, the adapter tube is preferably made of a composite material that is easy to drill through. Alternatively, the adapter may be a short tube having a length that extends only to a position such as 799 so that the amount of material to be drilled out during re-entry is smaller.

The sensors shown in addition to the Gyro-MWD sensors are for illustrative purposes only and not intended to be a limitation of the present invention.

In another embodiment of the invention, the gyro-MWD tool as described above may be used for making measurements-while-tripping (MWT). To do this, at the time that a drill string is to be pulled on a trip to replace the drill bit, the measuring instrument is used to make measurements as the drillstring is being pulled up. Typically, the drill string 20 is made up of 30-ft. sections of drillpipe and the surface assembly 10 is capable pulling up three sections of drillpipe (called a "stand"). Tripping thus requires that the drilling assembly downhole stays at a fixed depth while the stand is being removed. In an alternated embodiment of the invention, the indexing procedure described above is performed at one or more of these stationary positions during tripping. The results is a substantially uniformly spaced (in borehole depth, not necessarily true vertical depth) measurements that are used to give the wellbore inclination and azimuth. When combined with the known borehole depth (from the number of drillpipe segments being retrieved), a survey of the borehole may be obtained are discrete locations.

Those versed in the art would recognize that during tripping operations, circulation of mud is discontinued. Hence unless circulation is specifically resumed, the measurements made during tripping have to be stored in memory on the downhole tool for subsequent retrieval A particular advantage of making MWT is that the shallower portions of the borehole would be surveyed more times than the deeper portions of the borehole since the shallower portions would be tripped more times. The obtaining of multiple sets of data over the shallower section gives an improved statistical accuracy of the borehole inclination and azimuth, giving an improved survey at discrete locations.

Figure 9:
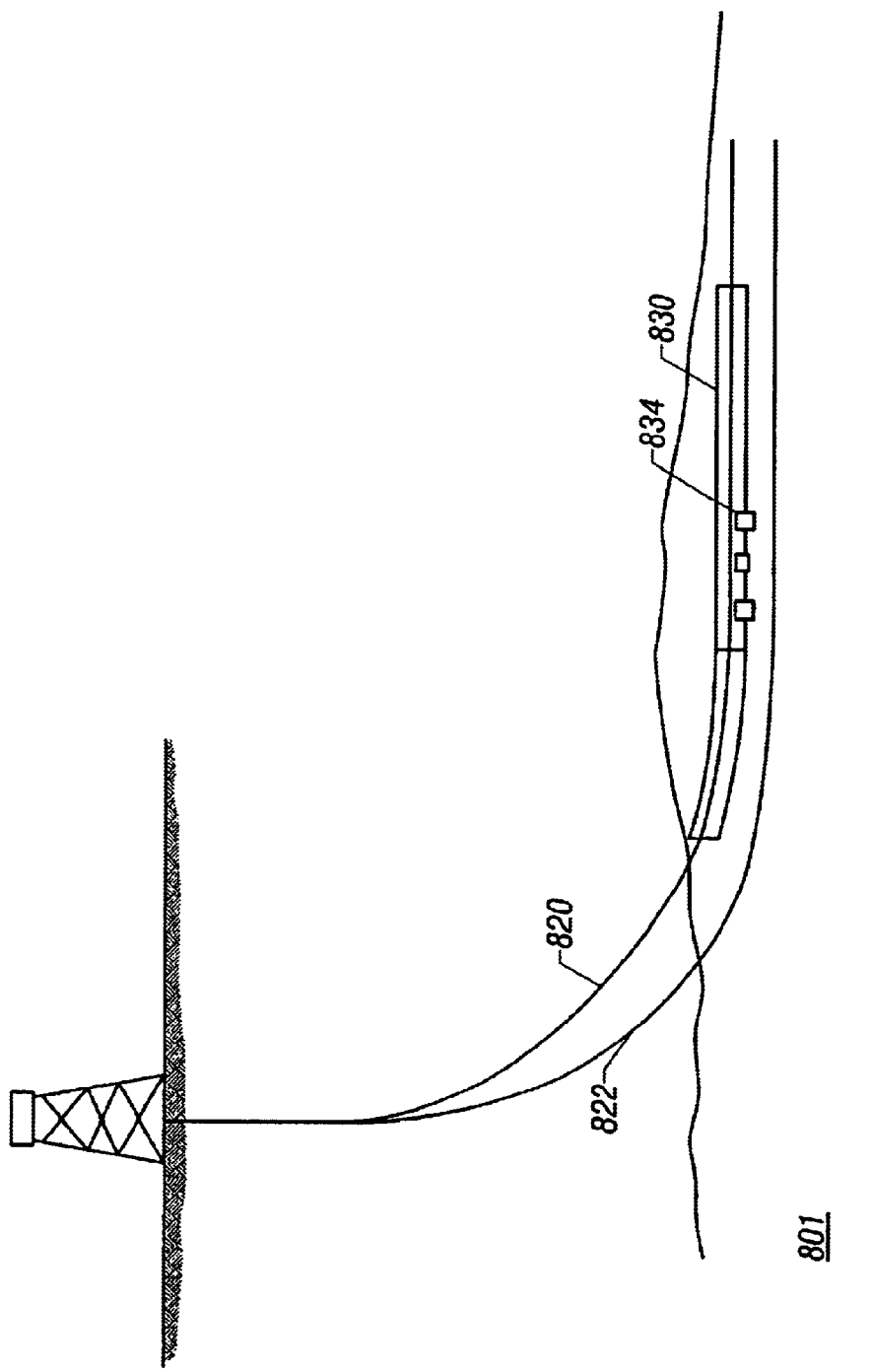
FIG. 9 shows use of the invention to drill a second borehole in accurate and close proximity to a cased production borehole.
Figure 10:
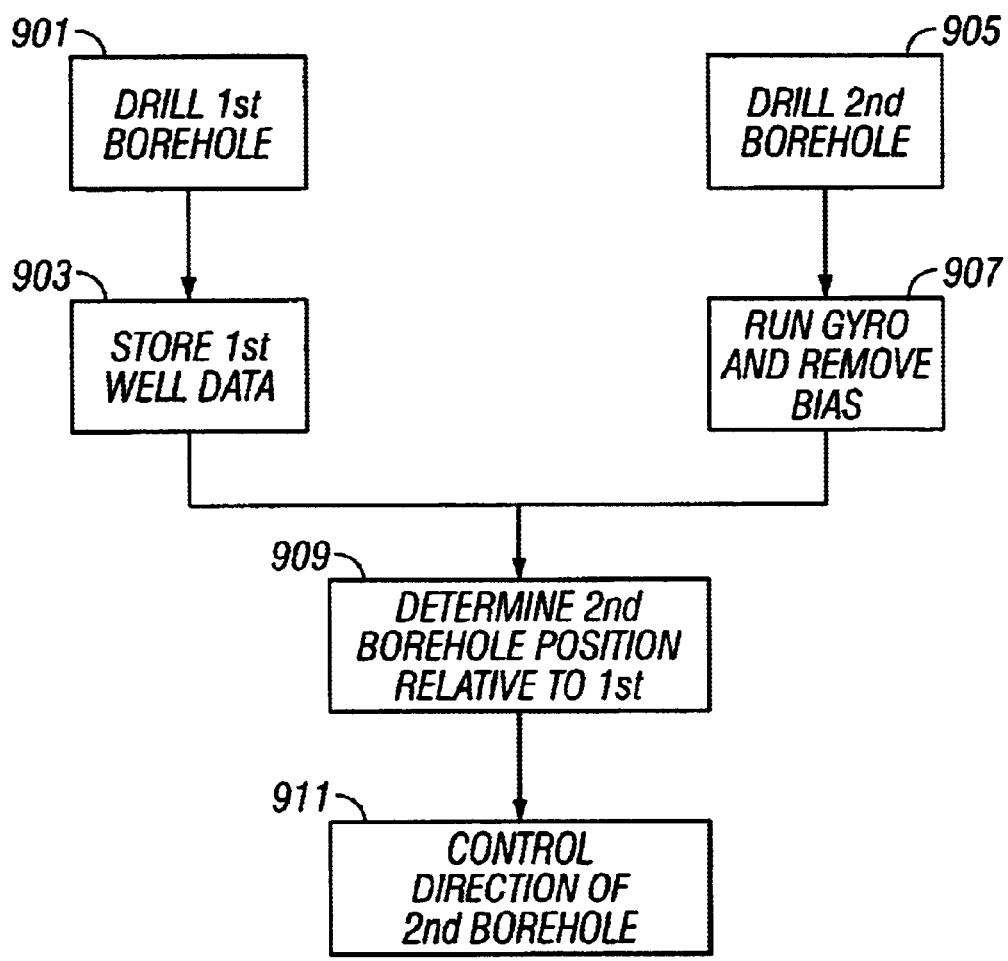
FIG. 10 is a flow chart of a method of the present invention used in development of a hydrocarbon resorvoir.

FIG. 9 illustrates an embodiment of the invention in secondary recovery operations. A producing wellbore 820 has been drilled into a reservoir interval 801 that contains hydrocarbons. For various reasons, such as low formation pressure or high viscosity of the hydrocarbons in the reservoir, production under natural conditions of hydrocarbons may be at uneconomically low rates. In such cases, a second wellbore 822 is drilled, typically as a sidebore (sidetrack) from the wellbore 820 so as to be substantially parallel to the main wellbore within the reservoir. The producing wellbore is typically cased with casing 830 that has perforations 834. Fluid, such as water, $CO_2$ or steam is then injected into the formation through the secondary wellbore 822 and the injected fluid drives the hydrocarbons in the formation towards the producing wellbore 820 where it may be recovered. Such an operation requires careful positioning of the secondary borehole 822 in proximity to the production wellbore 820. It is also important to maintain the secondary borehole in the same azimuth as the production wellbore. This is illustrated in FIG. 9. A first borehole is drilled 901 and information about its location is stored 903. When the second borehole is drilled 905, a gyro-MWD device such as that according to the description above is conveyed in the borehole 907. Bias in the gyro measurements is removed using any of the methods described above. The gyro output of the location of the second borehole is compared 909 to the known location of the first borehole and the direction of drilling of the second borehole is controlled 911 to maintain a desired spatial relation to the first borehole. Due to the fact that the production wellbore is cased, conventional magnetic techniques cannot be used to determine the inclination and azimuth of the secondary wellbore. Accordingly, in one embodiment of the invention, the position of the production wellbore is stored in a suitable memory and the information from the Gyro-MWD tool is used to control the direction of drilling of the secondary wellbore.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of recovery of hydrocarbons from a reservoir in a subterranean earth formation, the method comprising:

(a) drilling a first borehole into the reservoir;

(b) obtaining information about a position of the first borehole at least within the reservoir, (c) drilling a second borehole in proximity to the first borehole using a directional drilling device;

(d) making a measurement with a Gyro-MWD tool in the second borehole at a first rotational position;

(e) rotating the Gyro-MWD tool a plurality of discrete angles encompassing the first rotational position and taking additional measurements thereat, giving a plurality of additional measurements;

(f) determining a bias in measurements made by said Gyro-MWD tool from said measurements at said first rotational position and said plurality of discrete angles;

(g) determining from said measurements and said determined bias a position and orientation of the second wellbore; and (h) controlling the directional drilling device in response to the obtained information about the location of the first borehole and the determined position and orientation of the second wellbore so as to maintain a desired relation between the position of the first borehole and the position of the second borehole.

2. The method of claim 1 further comprising injecting a fluid selected from the group consisting of (i) water, (ii) $CO_2$, (iii) steam, and recovering hydrocarbons in the first borehole.

3. The method of claim 1 further comprising lining the first borehole with a casing.

4. The method of claim 1 wherein said desired relation further comprises the second borehole being at a desired azimuth relative to the first borehole.

5. The method of claim 1 wherein said information about the first borehole is obtained from a suitable memory device wherein said information was previously saved.

6. The method of claim 2 wherein said recovery of hydrocarbons occurs through perforations in a casing of said first borehole.

7. The method of claim 1 further comprising drilling said second borehole as a sidebore (sidetrack) of the first borehole.

* * * * *